(12) United States Patent
Kludt

(10) Patent No.: US 8,014,734 B2
(45) Date of Patent: Sep. 6, 2011

(54) METHOD, APPARATUS AND SYSTEM FOR CONTROLLING A TRANSMIT DIVERSITY DEVICE

(75) Inventor: Kenneth Kludt, Bedminster, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 740 days.

(21) Appl. No.: 12/048,651

(22) Filed: Mar. 14, 2008

(65) Prior Publication Data

US 2008/0227417 A1    Sep. 18, 2008

Related U.S. Application Data

(60) Provisional application No. 60/918,067, filed on Mar. 15, 2007.

(51) Int. Cl.
  *H03C 7/02*  (2006.01)
  *H04K 3/00*  (2006.01)
(52) U.S. Cl. .............................. 455/101; 455/69; 455/522
(58) Field of Classification Search ............... 455/69, 455/101, 522; 375/299
  See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,754,473 B1 * | 6/2004 | Choi et al. | .................. 455/101 |
| 6,810,264 B1 | 10/2004 | Park et al. | |
| 6,859,643 B1 | 2/2005 | Ma et al. | |
| 6,882,228 B2 | 4/2005 | Rofougaran | |
| 2002/0098872 A1 | 7/2002 | Judson | |
| 2003/0002594 A1 | 1/2003 | Harel et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |

(Continued)

FOREIGN PATENT DOCUMENTS

EP    0 986 193    3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Lee Nguyen
(74) *Attorney, Agent, or Firm* — Pearl Cohen Zedek Latzer, LLP

(57) ABSTRACT

A method of operating a transmit diversity device, wherein upon detection of a phase instability condition a power setting, such as a ratio of transmission power between different antennas, may be modified.

9 Claims, 4 Drawing Sheets

U.S. PATENT DOCUMENTS

| | | |
|---|---|---|
| 2005/0059355 A1 | 3/2005 | Liu |
| 2005/0143113 A1 | 6/2005 | Lee et al. |
| 2006/0135079 A1 | 6/2006 | Barnett et al. |
| 2006/0270359 A1 | 11/2006 | Karmi et al. |
| 2008/0227415 A1* | 9/2008 | Harel et al. .................. 455/101 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2008/057119 mailed Aug. 7, 2008.

* cited by examiner

METHOD, APPARATUS AND SYSTEM FOR CONTROLLING A TRANSMIT DIVERSITY DEVICE

CROSS-REFERENCE TO RELATED APPLICATIONS

This application claims benefit of U.S. Provisional Patent Application Ser. No. 60/918,067, entitled "Method, Apparatus and System for Controlling a Transmit Diversity Device" and filed Mar. 15, 2007, the entirety of which is incorporated by reference herein.

FIELD OF THE INVENTION

The present invention relates generally to the field of wireless communications and more specifically to modifying a signal by controlling transmit diversity parameters.

BACKGROUND OF THE INVENTION

Wireless transmission systems may use transmit diversity, whereby signals are transmitted to a receiver using a plurality of transmit antennas. Some transmit diversity systems may be based on the uplink power control (power control bits, reverse power control) provided by the base stations over the downlink to the mobile terminals. A transmitting modifying communication device may have multiple antenna elements that transmit signals to communicate information. A receiving feedback communication device may receive and extract information from the transmitted signals. Multiple antenna elements for transmission may enhance spectral efficiency and capacity, allowing for more users to be simultaneously served over a given frequency band, while reducing signal degradation caused by multi-path and fading. Transmit diversity parameters may be applied to signals transmitted from two or more antennas, and may modify an effective power distribution detected by receivers, such as base stations.

The transmitted signals may propagate along different paths and may reach the receiving communication device with different phases that may destructively interfere. The received signal quality may change at a receiver that may be attempting to detect a transmission from a mobile terminal, as well as a noise level created by a wireless terminal transmission in base stations attempting to detect signals from other wireless terminals. A signal-to-noise ratio perceived by base stations may change with varying parameters of transmit diversity control. There is a need for a system, method, and apparatus to improve the signal-to-noise ratio.

US Patent Publication No. 2003/0002594, entitled "Communication device with smart antenna using a quality-indication signal" and published Jan. 2, 2003, assigned to the assignee of the present application, the contents of which are hereby incorporated herein by reference, describes using a power control signal, for example, as provided by the power control bit of the CDMA protocol, as a quality indication signal. Information from a power control signal may be used to determine an adjustment of phase difference between the transmitting antennas.

SUMMARY OF EMBODIMENTS OF THE INVENTION

In accordance with the present invention, disadvantages and problems associated with previous techniques for modifying signals may be reduced or eliminated. In some embodiments of the invention, the method, system and apparatus described in US Patent Publication No. 2003/0002594 may be improved, supplemented or replaced by those describe herein.

A transmit diversity transmitter, for example, a mobile station, using a phase control algorithm, for example, based on power control signal feedback from a receiver, for example, a base station, may encounter phase instability, for example, where adjusting a phase difference may fail to improve performance. According to embodiments of the present invention, when phase instability is detected, a power setting may be adjusted, for example, a power ratio between a first transmitting antenna and a second transmitting antenna.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
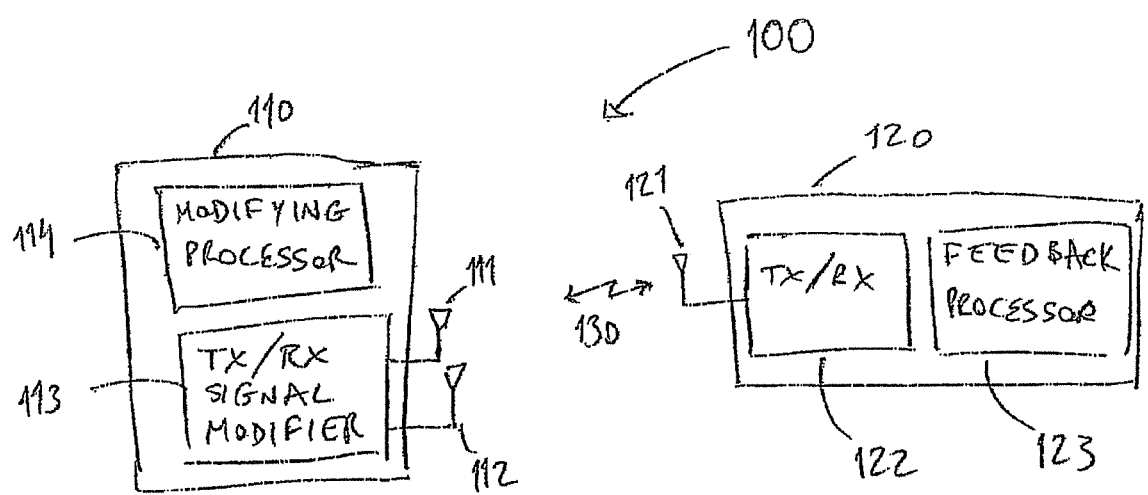
FIG. 1 is a block diagram illustrating one embodiment of a communication system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention and its advantages are best understood by referring to FIGS. 1 through 4 of the drawings, like numerals being used for like and corresponding parts of the various drawings.

FIG. 1 is a block diagram illustrating one embodiment of a communication system 100 that includes a transmitter 110, also referred to as a modifying communication device, that adjusts at least one nominal value of a transmit diversity parameter, for example, a phase difference between a signal transmitted on a first antenna 111 and a second antenna 112, and/or a power ratio between a signal transmitted on first antenna 111 and second antenna 112. According to the embodiment, transmitter 110 may, for example, perturb a signal at a perturbation rate and transmit the signal to receiving communication device 120, also referred to as a feedback communication device. Feedback communication device 120 may receive the transmit diversity signal at antenna 121 and transmit/receive module 122, process the received signal using processor 123, and transmit feedback information that describes the signal as received by feedback communication device 120. Modifying communication device 110 may receive the feedback information and adjust a nominal value of a transmit diversity parameter at a nominal value adjustment rate based on the feedback information.

According to the illustrated embodiment, communication system 100 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Communication system 100 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of communication system 100 may use any suitable multiple access technology, for example, a code division multiple access (CDMA) technology. According to one embodiment, communication system 100 may operate according to a CDMA 2000 telecommunications technology that uses a single CDMA channel. As an example, a CDMA 2000 high rate data packet technology, such as the Evolution Data Optimized (EvDO) technology may be used.

Communication system 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of communication system 100 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication system 100 may include one or more modifying communication devices 110 and one or more feedback communication devices 120 that communicate via a wireless link 130. Either or both of communication devices 110 and 120 may be any device operable to communicate information via signals with one or more other communication devices. For example, either of communication devices 110 or 120 may comprise a mobile subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

In some embodiments of the invention, the feedback communication device 120 may be a base station, and the modifying communication device 110 may be a mobile or other subscriber unit.

Either or both of communication devices 110 or 120 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 110 and 120 such as wireless link 130 may be a radio frequency link that is cellular in network organization. Wireless link 130 may be used to communicate a signal between communication devices 120 and 110.

As described more fully below, according to embodiments of the present invention, modifying communication device 110 may include a processor 114 and a transmit/receive module 113 that calculate and produce one or more signals for transmission over at least first and second antennas 111 and 112.

Feedback communication device 120 may include a processor 123 and transmit/receive module 122 that generate and transmit a feedback signal that indicates the quality of the modified signal as received at the feedback communication device 120. Modifying communication device 110 may then modify the transmit signal in accordance with feedback information corresponding to the feedback signal.

According to one embodiment, modifying a signal may refer to modifying a transmission signal feature. A transmission signal feature, or in some embodiments of the invention, a transmit diversity parameter, may refer without limitation to any feature of the transmission, for example, relative phase or phase difference, relative amplitude, relative power or power ratio, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined and/or controlled on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 110.

According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device 110 may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to phase, a perturbation may include modulating the phase difference in a first direction, and modulating the phase difference in a second direction. If the feedback information provided by the feedback communication device 120 indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be modified relative to a previous value by adding a positive or negative amount, which may be constant, determined from a predetermined number of amounts, or otherwise calculated based on the feedback information. Typically, phase difference may be changed by an amount in degrees, whereas power ratio may be changed by an amount in percent or decibels, or any other measure of relation or comparison. It will be recognized that typically, when modifying a power ratio, the total or absolute power is mandated by the air interface, and therefore may either not change, or may change in a degree unrelated to the power ratio adjustment. Thus, for example, if the base station issues a power down command, the change in transmit diversity parameter may be relative to a transmit diversity parameter in a previous power control group or slot, or relative to transmit diversity parameter in multiple power control groups or slots as described in US Patent Publication No. 2006/0270359, entitled "Determining a phase adjustment in accordance with power trends" and published Nov. 30, 2006.

In an embodiment of the present invention, feedback communication device 120 may transmit to modifying communication device 110 a power control signal, for example, one or more power control bits, or any type or group of power control signals may be used. A power control signal may indicate to the modifying communication device 110 that it should raise or lower its total power. For example, based on the parameter being modulated, a "quality up" outcome value may instruct modifying communication device 110 to increase the total power of its transmitted signal, and a "quality down" outcome value may instruct modifying communication device 110 to decrease the total power. An outcome value may comprise, for example, a power control bit of a CDMA power control signal, for which "0" represents a command to increase power and a "1" represents a command to decrease power. Thus, for example, a bit value of "1" requesting a decrease in power may indicate "quality up," and a bit value of "0" requesting an increase in power may indicate "quality down." Some CDMA or W-CDMA protocols may allow for additional outcomes, for example, no change in power.

Figure 2:
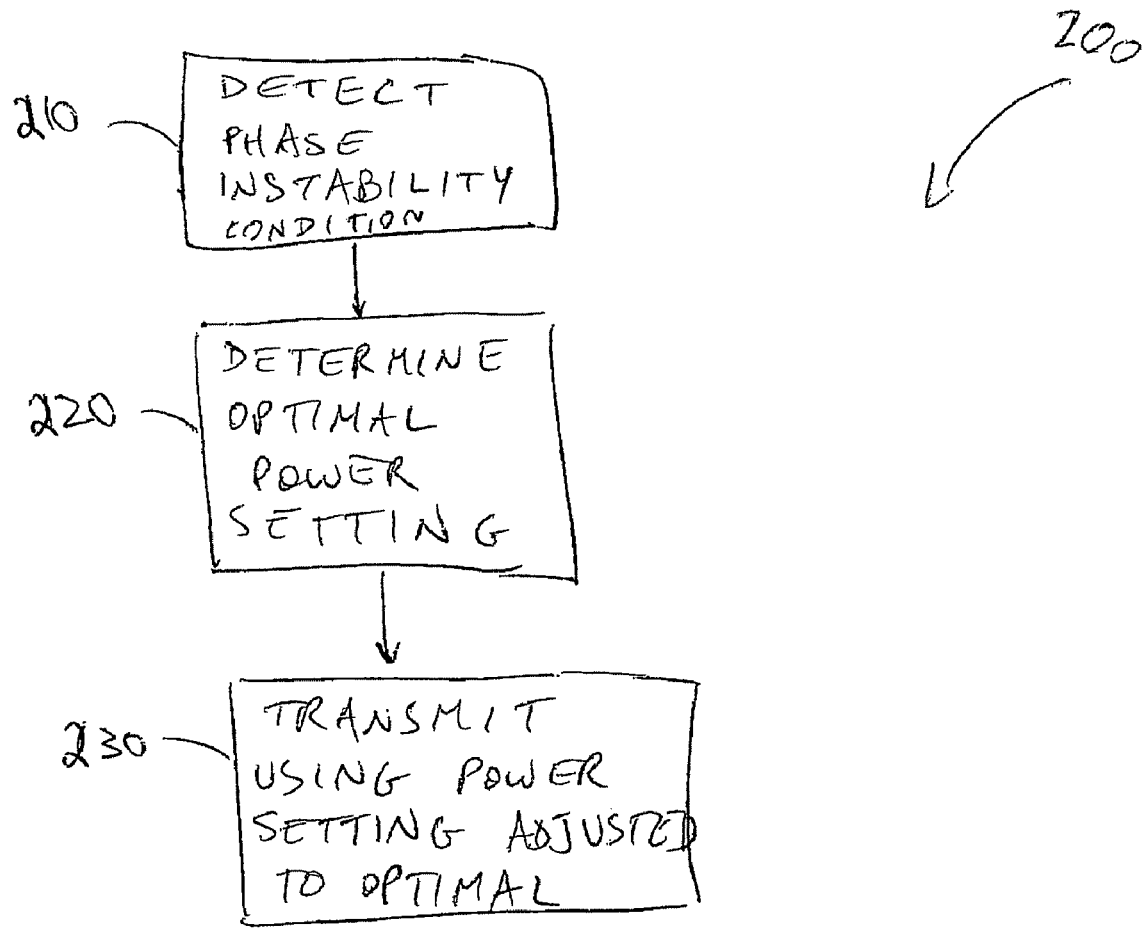
FIG. 2 depicts a basic method of adjusting a power setting based on a phase instability condition in accordance with the present invention.

FIG. 2 depicts a basic method 200 in accordance with the present invention. First, a phase instability condition may be detected (210). In the context of the present invention, phase instability refers to a condition in which a change of phase difference between a transmitter's first and second antennas does not result in a change of performance. Thus, for example, a phase instability condition may be detected when change of phase difference neither improves nor degrades performance. Such phase instability may be determined using a variety of techniques, all within the scope of the present invention, some of which are detailed below.

Upon determining a phase instability condition, the transmitter may determine an optimal power setting (220), preferably a power setting different from the then-current power setting. For example, in an embodiment of the present invention described in further detail below, a number of power settings may be attempted, each resulting in feedback from the receiver, for example, in the form of a power control signal or otherwise. The feedback for each power setting may be compared and an optimal power setting established.

Finally, the transmitter may transmit the signal(s) using the power setting adjusted to the optimal level as determined (230).

Figure 3:
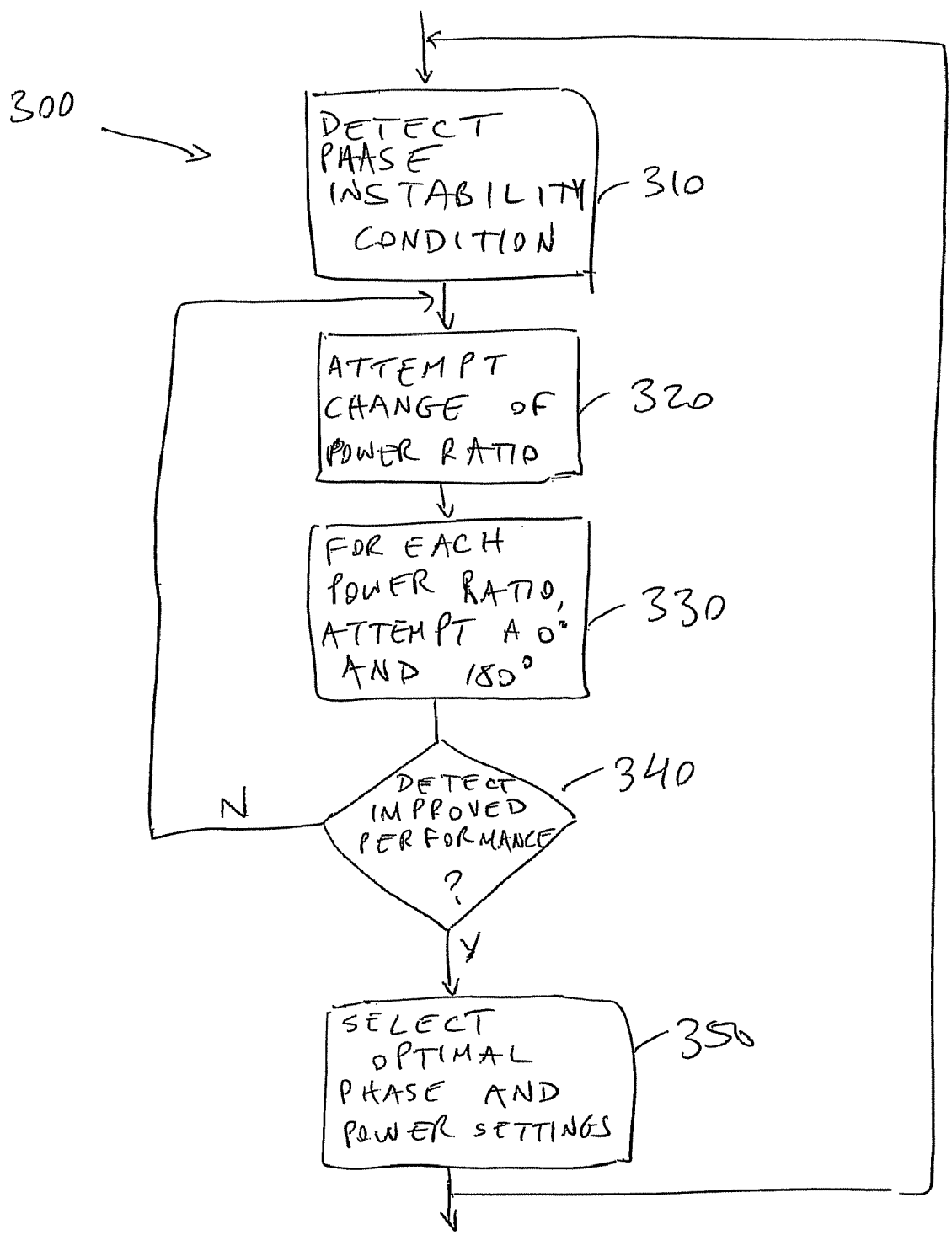
FIG. 3 depicts a method in accordance with an embodiment of the invention relating to determining a power setting.

FIG. 3 depicts a method 300 in accordance with an embodiment of the invention specifying a technique for determining an optimal power setting. In embodiments of the invention, when the phase loop is unstable, it may be assumed that the path attenuation for a one antenna (the dominant antenna) is greater than the second antenna (the weak antenna), such that the signal arriving at the base station has little effect (up or down). At this point, it may be assumed that the transmission parameters are now sufficiently utilizing the dominant antenna, and the power ratio loop may be initiated in order to obtain a power ratio that utilizes the dominant antenna. Accordingly, not knowing the direction or degree of the imbalance between the dominant or the weak antenna, the method may therefore test the conditions with power ratio perturbations until a power ratio stability condition is reached. The power ratio loop may be performed until performance is improved, or until the power ratio returns to an initial condition, e.g., 0 dB. Thus, when the power ratios have stabilized, for example, to less than some arbitrary threshold (e.g., 3 dB), the method may return to the phase control loop again until a phase instability condition is again detected. One implementation of the above method may be described in further detail below with respect to FIG. 3.

As an initial condition, the power on each antenna may be equal, for example, 0 dB power ratio. A phase instability condition may be detected (310). This detection may be done, for example, by determining that a successive number of phase changes have resulted in no indication of improved performance from the receiver. For example, in one embodiment of the present invention, feedback may come in the form of a power control bit from a base station. There may be any number of algorithms used for determining a change of phase based on the feedback from the base station, all of which may be used in conjunction with the present invention. According to embodiments of the invention, phase instability condition may be determined based on the phase differences that result from the feedback. Thus, upon a number of phase difference adjustments and little or no indication of changed performance from the base station, a phase instability detection condition may be established. For example, in one embodiment, a counter may track a number of phase difference adjustments and corresponding feedback indications from the receiver. A phase instability condition may be established, for example, if the number of feedback signals indicating an improvement is less than a minimum threshold. For example, if for the most recent ten phase difference adjustments, three or less feedback indications of improved performance have been received, a phase instability condition may be established. In another example, the threshold may be at two or less improved feedback indications. In another example, the threshold may be at one or less improved feedback indications. In another example, the threshold may be at zero improved feedback indications. Other thresholds may be used consistent with the teachings of the present invention.

In another embodiment of the invention, phase instability detection may be established by keeping track of the phase difference rotations with less than a threshold number of improved performance indications from the receiver. For example, in one embodiment of the invention in which phase adjustments are made based on a constant increment, a counter may be set to indicate a phase instability condition upon a number 360°/N phase adjustments, where N represents the number of degrees in a phase adjustment increment. In another embodiment, a counter may be set to indicate a phase instability condition upon a total M×360° of phase adjustments, where M is a selected positive integer. Again, a threshold may be set to count the number of improved quality feedback indications.

Upon detection of a phase instability condition, a change of power ratio may be attempted (320). In one embodiment of the invention, transmission may be attempted at changes of $\pm P_{Max}$ where $P_{Max}$ represents a maximum power level, for example, 6 dB power ratio difference between signals sent on first and second antennas. In another embodiment, gradations of power ranges may be attempted before reaching $P_{Max}$, for example, $\pm P_{Max}/2$ in one embodiment, or $\pm P_{Max}/3$ and $\pm 2 \times P_{Max}/3$ in another embodiment. The power ratios may be changed in a manner such that the total power applied to both antennas is unchanged, e.g., if the power of both antennas is equal and the power to one antenna is reduced by 25%, then the power of the other must be increased by 25%. Initial power ratios other than unity may result in different percentage adjustments upward and downward.

In one embodiment of the invention, for each power ratio attempted, the phase difference between antennas may optionally or periodically set to 0° and 180° (330), in order to increase the probability of finding a combination of parameters to produce constructive interference at the receiver.

If, upon change of power ratio, and using a number of phase differences, e.g., 0° and 180°, no improvement or other change is detected in performance (340), another modification may be made to the power ratio (320) and the phase difference between antennas may optionally be set to 0° and 180° (330). For example, a sequence of power ratios may be defined, ranging from greater power on one antenna to equal power and continuing to greater power on another antenna. Reciprocal power ratios may be attempted. Thus, for example, a range of power rations may be +6 dB (quadruple the power on one antenna), +3 dB (double the power on one antenna), 0 dB (equal power), −3 dB (double the power on another antenna), and −6 dB (quadruple the power on another antenna).

If an improvement in performance is detected (340), for example, by an algorithm mentioned above, based on feedback from the base station, the power ratio and phase parameters at which change is noted may be selected as optimal (350). It will be understood that if a degradation in performance is detected, the power ratio or phase difference may be reversed and these diversity transmission parameters selected as optimal. The process may repeat when a phase instability condition is detected.

If no change in performance is detected based on variation in power ratio after one or more iterations of the range of power ratios is attempted, then a power ratio may be selected, for example, a unity power ratio, and the phase differences may be varied again, and the process repeated. It will be recognized that the changes in power ratio and/or phase difference do not necessarily affect the total power transmitted to the base station by the mobile station.

Figure 4:
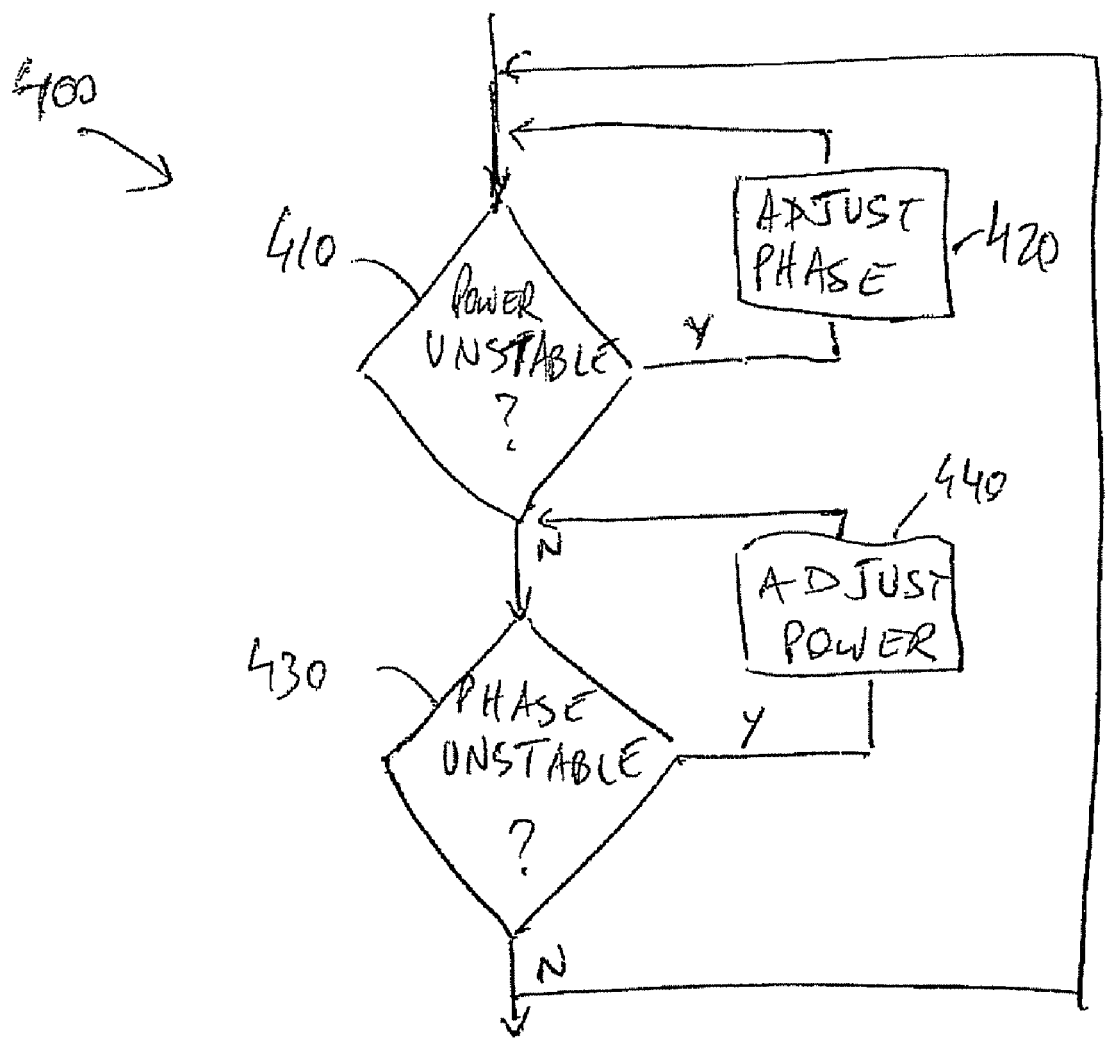
FIG. 4 represents a schematic diagram of a method of combining a phase adjustment process and a power adjustment process in accordance with an embodiment of the present invention.

The method of detecting and/or operating in an unstable phase condition may be used in conjunction with phase adjustment algorithms previously disclosed by the assignee of the present application. FIG. 4 represents a schematic diagram of a method 400 of combining a phase adjustment process and a power adjustment process. A method may determine whether a power unstable condition is detected (410). If so, a phase difference may be adjusted (420) until a stabilization condition occurs. In one embodiment of the invention in which a power control bit or signal is used as a quality indicator, the stabilization condition may be a "power down" indication after a series of "power up." Upon a stabilization condition, it may be determined whether a phase instability condition is established (430), and if so, to take power adjustment steps (440), both as disclosed above. The process may repeat throughout transmission. It will be recognized that in some embodiments, the instability detection steps 410 and 430 may take place in parallel or in serial, etc.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals can tune the communication device. In other words, the tuning of a communication device through the use such control signals need not be limited to information about varying the magnitude and phase of the signal. For example, the control signals can carry information to vary the magnitude, phase, frequency and/or timing of the signal associated with each antenna element.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

What is claimed is:

1. A method of controlling a mobile communication apparatus comprising:
    transmitting a plurality of signals using a plurality of antennas, wherein signals respectively transmitted on the antennas differ by a plurality of phase differences respective to the plurality of transmissions, wherein in said plurality of transmissions, signals transmitted by the plurality of antennas have a first power ratio therebetween;
    detecting a phase instability condition based at least on said plurality of phase differences by detecting that the plurality of phase differences comprise a progression of phase differences substantially in the same direction; and
    if said phase instability condition is detected, then in a subsequent transmission, transmitting a signal on the plurality of antennas using a second power ratio between said antennas, different from said first power ratio.

2. The method of claim 1, wherein first and subsequent phase differences in said progression differ by a multiple of 360°.

3. The method of claim 1, wherein said progression of phase differences substantially in the same direction comprise a predetermined number of phase difference changes.

4. The method of claim 1, wherein if said phase instability condition is detected, then the subsequent transmission comprises:
    transmitting a signal on the plurality of antennas using the second power ratio between said antennas, wherein the difference between the first phase difference and the second phase difference is 0°; and
    transmitting a signal on the plurality of antennas using the second power ratio between said antennas, wherein the difference between the first phase difference and the second phase difference is 180°.

5. The method of claim 1, further comprising if said phase instability condition is detected, then in subsequent transmissions, transmitting a signal on the plurality of antennas using a plurality of power ratios between said antennas.

6. The method of claim 5, further comprising if said phase instability condition is detected, then in subsequent transmissions, transmitting a signal on the plurality of antennas using a sequence of power ratios between said antennas until a change in performance is detected.

7. The method of claim 6, further comprising transmitting a signal using transmission settings selected based on transmission settings that produced the detected change in performance.

8. The method of claim 5, further comprising:
    if said phase instability condition is detected, then in subsequent transmissions, transmitting a signal on the plurality of antennas using a sequence of power ratios between said antennas until reciprocal power ratios between the antennas are tested; and
    if no change in performance is detected for reciprocal power ratios between antennas, then transmitting a signal on the antennas using unity power ratio and an adjusted phase difference between the antennas.

9. The method of claim 5, further comprising:
    if said phase instability condition is detected, then in subsequent transmissions, transmitting a signal on the plurality of antennas using a sequence of power ratios between said antennas until the power ratio between the antennas is approximately one; and
    if no change in performance is detected when the power ratio between the antennas is approximately one, then transmitting a signal on the antennas using unity power ratio and an adjusted phase difference between the antennas.

* * * * *